US012808749B2

(12) United States Patent
Jeong

(10) Patent No.: US 12,808,749 B2
(45) Date of Patent: Nov. 24, 2026

(54) OPTICAL FIBER BENDING LOSS MEASURING METHOD

(71) Applicant: SUMITOMO ELECTRIC INDUSTRIES, LTD., Osaka (JP)

(72) Inventor: Jongde Jeong, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 132 days.

(21) Appl. No.: 18/836,511

(22) PCT Filed: Aug. 9, 2023

(86) PCT No.: PCT/JP2023/029089
§ 371 (c)(1),
(2) Date: Aug. 7, 2024

(87) PCT Pub. No.: WO2024/034636
PCT Pub. Date: Feb. 15, 2024

(65) Prior Publication Data

US 2025/0164347 A1 May 22, 2025

(30) Foreign Application Priority Data

Aug. 12, 2022 (JP) ................................ 2022-128675

(51) Int. Cl.
*G01M 11/08* (2006.01)

(52) U.S. Cl.
CPC ................................ *G01M 11/088* (2013.01)

(58) Field of Classification Search
CPC .......................... G01M 11/088; G01M 11/335
See application file for complete search history.

(56) References Cited

U.S. PATENT DOCUMENTS

2006/0039665 A1* 2/2006 Matsuo .............. G02B 6/03672 385/127
2012/0236295 A1 9/2012 Nakanishi et al.
(Continued)

FOREIGN PATENT DOCUMENTS

JP H06-288865 A 10/1994
JP 2005-181664 A 7/2005
(Continued)

OTHER PUBLICATIONS

International Search Report for PCT/JP2023/029089 dated Sep. 12, 2023.

*Primary Examiner* — Hina F Ayub
(74) *Attorney, Agent, or Firm* — McDonald Hopkins LLC

(57) ABSTRACT

A method for measuring a bending loss of an optical fiber includes: determining a reference number of turns by which a wavelength dependency of a bending loss value of the optical fiber in a region of a predetermined transmission wavelength or less when the optical fiber is wrapped around a mandrel has an exponential function shape with respect to a transmission wavelength; measuring a first power of light for the optical fiber wrapped by the reference number of turns; and measuring a second power of light for the optical fiber wrapped by a number of turns larger than the reference number of turns. The method further includes obtaining, based on the first power of light and the second power of light, a bending loss value of the optical fiber at the predetermined transmission wavelength when the optical fiber is bent with the predetermined diameter.

5 Claims, 3 Drawing Sheets

(56) References Cited

U.S. PATENT DOCUMENTS

| | | | |
|---|---|---|---|
| 2014/0205250 | A1 | 7/2014 | Guenteri et al. |
| 2023/0236087 | A1 | 7/2023 | Kawaguchi et al. |

FOREIGN PATENT DOCUMENTS

| | | | |
|---|---|---|---|
| JP | 2007-057328 | A | 3/2007 |
| JP | 2012-194004 | A | 10/2012 |
| WO | 2021251473 | A1 | 12/2021 |

* cited by examiner

OPTICAL FIBER BENDING LOSS MEASURING METHOD

TECHNICAL FIELD

The present disclosure relates to a method for measuring a bending loss of an optical fiber.

This application claims priority to and the benefit of Japanese Patent Application No. 2022-128675 filed in the Japan Patent Office on Aug. 12, 2022, the entire contents of which are incorporated herein by reference.

BACKGROUND ART

Patent Literature 1 discloses a method for measuring a bending loss of an optical fiber. In this measurement method, a bending loss of an optical fiber is measured by taking a difference between transmitted light power when the optical fiber is not bent and transmitted light power when the optical fiber is bent.

CITATION LIST

Patent Literature

Patent Literature 1: JP2012-194004A.

SUMMARY OF INVENTION

A method for measuring a bending loss of an optical fiber of the present disclosure is a method for measuring a bending loss of an optical fiber coated with resin, the method including:

- a first process of determining a reference number of turns by which a wavelength dependency of a bending loss value of the optical fiber in a region of a predetermined transmission wavelength or less when the optical fiber is wrapped around a mandrel with a predetermined diameter has an exponential function shape with respect to a transmission wavelength;
- a second process of causing light with a predetermined power at the predetermined transmission wavelength to be incident on a first end of the optical fiber in a state in which the optical fiber is wrapped around the mandrel by the reference number of turns, and measuring a power of light emitted from a second end of the optical fiber;
- a third process of causing light with the predetermined power at the predetermined transmission wavelength to be incident on the first end of the optical fiber in a state in which the optical fiber is wrapped around the mandrel by a number of turns larger than the reference number of turns, and measuring a power of light emitted from the second end of the optical fiber; and
- a fourth process of obtaining, based on the power of light measured in the second process and the power of light measured in the third process, a bending loss value of the optical fiber at the predetermined transmission wavelength when the optical fiber is bent with the predetermined diameter.

DESCRIPTION OF EMBODIMENTS

Technical Problem

Figure 1:
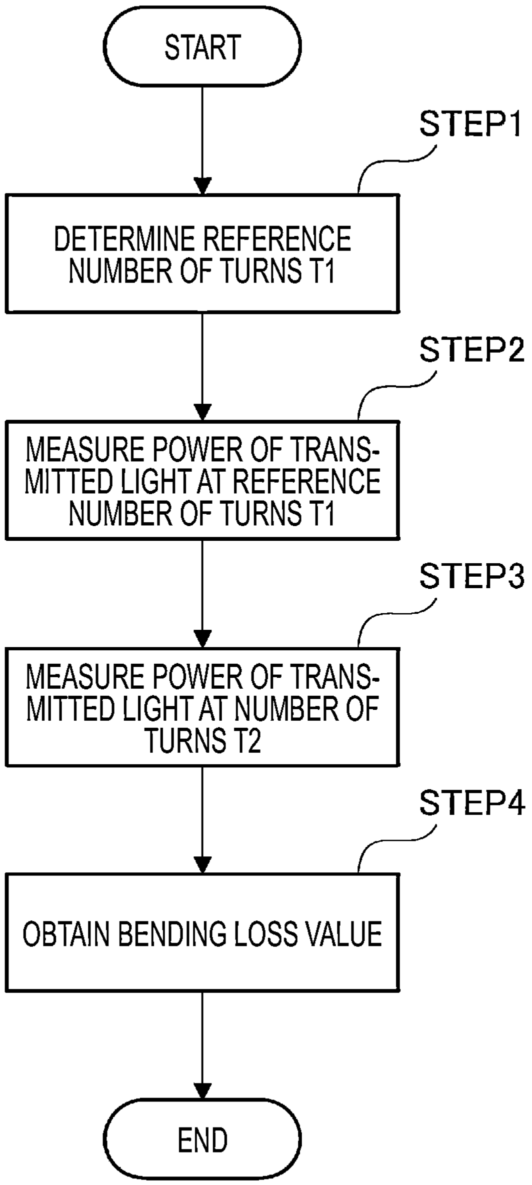
FIG. 1 is a view showing a flow of a method for measuring a bending loss of an optical fiber according to an embodiment.

When a portion of light (whispering gallery mode light) leaked from a core to a clad at a bent portion of an optical fiber is Fresnel reflected at an interface between a coating layer and the air and recombines with core mode light, interference occurs between the core mode light and the whispering gallery mode light, making it difficult to accurately measure a bending loss of the optical fiber.

An object of the present disclosure is to more accurately measure a bending loss of an optical fiber.

Advantageous Effects of Present Disclosure

According to the present disclosure, it is possible to more accurately measure a bending loss of an optical fiber.

DESCRIPTION OF EMBODIMENTS OF PRESENT DISCLOSURE

First, embodiments of the present disclosure are enumerated and described.

A method for measuring a bending loss of an optical fiber of the present disclosure is:

(1) a method for measuring a bending loss of an optical fiber coated with resin, the method including:

- a first process of determining a reference number of turns by which a wavelength dependency of a bending loss value of the optical fiber in a region of a predetermined transmission wavelength or less when the optical fiber is wrapped around a mandrel with a predetermined diameter has an exponential function shape with respect to a transmission wavelength;
- a second process of causing light with a predetermined power at the predetermined transmission wavelength to be incident on a first end of the optical fiber in a state in which the optical fiber is wrapped around the mandrel by the reference number of turns, and measuring a power of light emitted from a second end of the optical fiber;
- a third process of causing light with the predetermined power at the predetermined transmission wavelength to be incident on the first end of the optical fiber in a state in which the optical fiber is wrapped around the mandrel by a number of turns larger than the reference number of turns, and measuring a power of light emitted from the second end of the optical fiber; and
- a fourth process of obtaining, based on the power of light measured in the second process and the power of light measured in the third process, a bending loss value of the optical fiber at the predetermined transmission wavelength when the optical fiber is bent with the predetermined diameter.

According to the above method, the bending loss of the optical fiber is calculated based on the powers of the two transmitted lights that are not affected by the whispering gallery mode light. This makes it possible to more accurately obtain a bending loss value of the optical fiber.

(2) The method in the above (1), in which the optical fiber may be wrapped around the mandrel with the predetermined diameter, a number of turns by which a wavelength dependency of a bending loss value of the optical fiber in the region of the predetermined transmission wavelength or less has an exponential function shape with respect to a transmission wavelength may be obtained, and the obtained number of turns of the optical fiber may be used as the reference number of turns in the first process.

According to the above method, since the reference number of turns is set using the optical fiber that is a measurement target, it is possible to obtain a bending loss value that is not affected by whispering gallery mode light.

(3) The method in the above (1), in which a standard optical fiber may be prepared, the standard optical fiber may be wrapped around a mandrel with the predetermined diameter, a number of turns by which a wavelength dependency of a bending loss value of the standard optical fiber in a region of the predetermined transmission wavelength or less has an exponential function shape with respect to a transmission wavelength may be obtained, and the obtained number of turns of the standard optical fiber may be used as the reference number of turns in the first process.

According to the above method, the reference number of turns is set in advance using the standard optical fiber, so the time and effort for setting the reference number of turns each time the bending loss of the optical fiber is measured can be reduced.

(4) The method in the above (3), in which when a bending loss value per one turn of the optical fiber obtained from the bending loss value obtained in the fourth process is smaller than a bending loss value per one turn of the standard optical fiber obtained from the bending loss value of the standard optical fiber, the optical fiber may be used as the standard optical fiber.

According to the above method, the reference number of turns is recalculated based on the optical fiber that is more resistant to bending, so it is possible to obtain a bending loss value that is not affected by whispering gallery mode light.

Details of Embodiments of Present Disclosure

A specific example of a method for measuring a bending loss of an optical fiber according to an embodiment of the present disclosure will be described below with reference to the drawings. Note that the present invention is not limited to these examples, is defined by the claims, and is intended to include all changes made within the meaning and scope equivalent to the claims.

Figure 2:
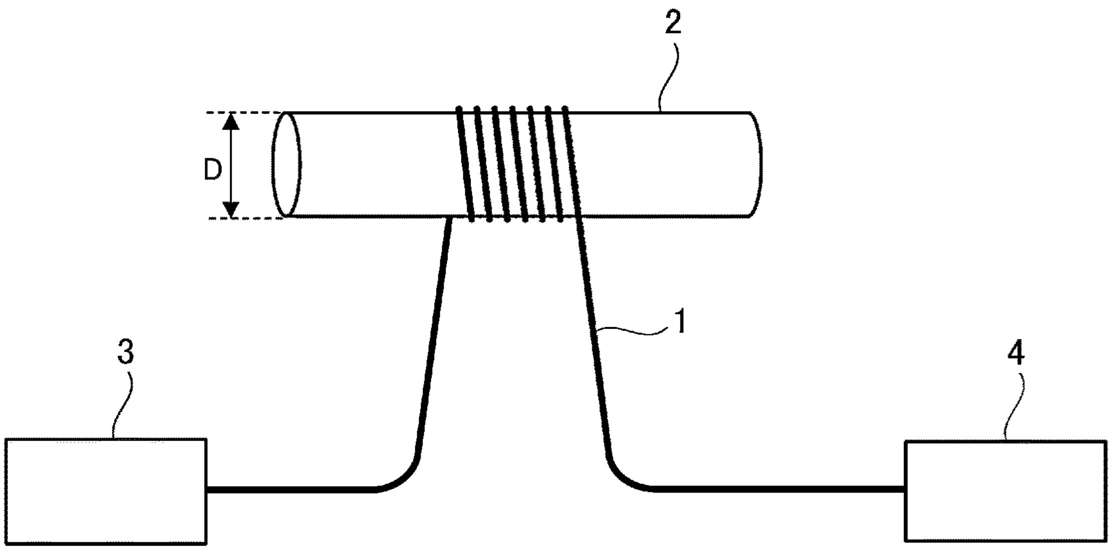
FIG. 2 is a view for illustrating a method for measuring a transmission loss value of an optical fiber.

FIG. 1 is a view showing a flow of a method for measuring a bending loss of an optical fiber 1 according to the present embodiment. FIG. 2 is a view for illustrating a method for measuring a power of light incident on one end (first end) of the optical fiber 1 and emitted from the other end (second end). The optical fiber 1 that is a measurement target includes a core made of glass and a clad, and the periphery of the clad is covered with a coating layer made of resin.

In a method for measuring a bending loss value of the optical fiber 1 at a predetermined transmission wavelength, as illustrated in FIG. 1, first, a reference number of turns T1 of the optical fiber 1 wrapped around a mandrel 2 is determined (STEP1). The reference number of turns T1 is a number of turns that is a reference used to obtain a bending loss value of the optical fiber 1. The reference number of turns T1 is set to a number of turns by which a wavelength dependency of the bending loss value of the optical fiber 1 in a region of a predetermined transmission wavelength or less is not affected by whispering gallery mode light. The predetermined transmission wavelength is, for example, 1550 nm or 1625 nm. Specifically, the reference number of turns T1 is set to a number of turns by which a wavelength dependency of the bending loss value of the optical fiber 1 in a region of a predetermined transmission wavelength or less when the optical fiber 1 is wrapped around the mandrel 2 has an exponential function shape with respect to a transmission wavelength. Note that the expression "not affected by whispering gallery mode light" is not limited to a state in which the wavelength dependency is not completely affected by whispering gallery mode light but includes a state in which the influence of whispering gallery mode light is small enough to be ignored.

The reference number of turns T1 may be calculated each time the bending loss value of the optical fiber 1 is obtained. Specifically, in FIG. 2, first, in a state in which the optical fiber 1 is not wrapped around the mandrel 2, light with a predetermined power is caused to be incident on one end of the optical fiber 1 from a light source 3, and a power of light emitted from the other end of the optical fiber 1 (hereinafter, referred to as transmitted light power P0) is measured using a power meter 4. This measurement is performed using light at each wavelength (λ) equal to or less than the predetermined transmission wavelength to obtain the transmitted light power (P0(λ)) for each wavelength (λ).

Subsequently, in a state in which the optical fiber 1 is wrapped around the mandrel 2, light with the predetermined power is caused to be incident on one end of the optical fiber 1 from the light source 3, and a power of light emitted from the other end of the optical fiber 1 (hereinafter referred to as transmitted light power P1) is measured using the power meter 4. This measurement is performed using light at each wavelength (λ) equal to or less than the predetermined transmission wavelength to obtain the transmitted light power (P1(λ)) for each wavelength (λ).

Subsequently, a bending loss value L(λ) at each wavelength (λ) is calculated. Specifically, the bending loss value L(λ) is calculated by $L(\lambda)[dB]=-10\log(P1(\lambda)[W]/P0(\lambda)[W])$. Thereby, the wavelength dependency of the bending loss value of the optical fiber 1 is obtained.

Then, the wavelength dependency of the bending loss value of the optical fiber 1 in the region of the predetermined transmission wavelength or less is obtained, while changing the number of turns of the optical fiber 1 to be wrapped around the mandrel 2 until the obtained wavelength dependency of the bending loss value has an exponential function shape with respect to the transmission wavelength. When the obtained wavelength dependency of the bending loss value has an exponential function shape with respect to the transmission wavelength, the number of turns of the optical fiber 1 on the mandrel 2 at this time is set as the reference number of turns T1.

Subsequently, in a state where the optical fiber is wrapped around the mandrel 2 by the reference number of turns T1, light with the predetermined power at the predetermined transmission wavelength is caused to be incident on one end of the optical fiber 1 from the light source 3, and a power of light emitted from the other end of the optical fiber 1 (hereinafter, referred to as transmitted light power P10) is measured using the power meter 4 (STEP 2).

Subsequently, in a state where the optical fiber is wrapped around the mandrel 2 by a number of turns T2, light with the predetermined power at the predetermined transmission wavelength is caused to be incident on one end of the optical fiber 1 from the light source 3, and a power of light emitted from the other end of the optical fiber 1 (hereinafter, referred to as transmitted light power P11) is measured using the power meter 4 (STEP 3). The number of turns T2 is set to be larger than the reference number of turns T1.

Subsequently, based on the transmitted light power P10 measured in STEP 2 and the transmitted light power P11 measured in STEP 3, a bending loss value of the optical fiber 1 at the predetermined transmission wavelength when the optical fiber 1 is bent with a predetermined diameter D is obtained (STEP4). Specifically, based on the transmitted light power P10 and the transmitted light power P11, the bending loss value L[dB] of the optical fiber 1 at the predetermined transmission wavelength is obtained by L=−10 log(P11[W]/P10[W]). Note that when obtaining the bending loss value per one turn, the bending loss value is obtained by dividing the bending loss value L by a difference between the number of turns T2 and the number of turns T1.

Here, the bending loss of the optical fiber 1 is caused by a portion of core mode light leaking to the clad at a bent portion of the optical fiber 1. A portion of light (whispering gallery mode light) leaked to the clad is Fresnel reflected at an interface between the coating layer and the air and combines again with the core mode light, and upon this recombination, interference occurs between the core mode light and the whispering gallery mode light. Due to the interference, vibration components occur at certain optical frequency intervals in a transmission spectrum of the bent optical fiber, making it difficult to accurately measure a bending loss. The smaller a bending diameter of the optical fiber, the more significant the generation of whispering gallery mode light becomes. Therefore, when the bending diameter of the optical fiber 1 is small, it is difficult to accurately measure the bending loss.

On the other hand, whispering gallery mode light has the property of becoming less likely to be generated by increasing the number of times the optical fiber 1 is wrapped around the mandrel 2. Therefore, in the method for measuring a bending loss of an optical fiber according to the present embodiment, the transmitted light power P10 at the predetermined transmission wavelength of the optical fiber 1 wrapped by the reference number of turns T1 at which whispering gallery mode light is less generated is used as a reference. Based on the transmitted light power P10 and the transmitted light power P11 at the predetermined transmission wavelength of the optical fiber 1 wrapped by the number of turns T2 larger than the reference number of turns T1, the bending loss value of the optical fiber 1 at the predetermined transmission wavelength is calculated. That is, the bending loss value of the optical fiber 1 at the predetermined transmission wavelength is calculated based on the two transmitted light powers P10 and P11 that are not affected by whispering gallery mode light. This makes it possible to more accurately measure the bending loss of the optical fiber 1.

Note that in the present embodiment, the reference number of turns T1 is calculated each time the bending loss value of the optical fiber 1 is obtained. However, the reference number of turns T1 is not calculated each time the bending loss value of the optical fiber 1 is obtained, but may be set in advance.

For example, the reference number of turns T1 may be obtained using a standard optical fiber separately from the optical fiber that is a measurement target. Specifically, a standard optical fiber is wrapped around the mandrel 2 having a predetermined diameter D, and a bending loss value of the standard optical fiber in a region of a predetermined transmission wavelength or less is obtained. Note that the mandrel 2 may be a mandrel used to obtain the bending loss value of the optical fiber 1, or may be a different mandrel having a predetermined diameter D. Then, a number of turns by which the wavelength dependency of the obtained bending loss value of the standard optical fiber has an exponential function shape with respect to the transmission wavelength is set as the reference number of turns T1. Note that the term "standard optical fiber" refers to an optical fiber that serves as a reference for setting the reference number of turns T1. For example, as the standard optical fiber, an optical fiber of the same type as the optical fiber that is a measurement target is used.

Alternatively, as the reference number of turns T1, a reference number of turns used in past bending loss measurement may be used. In this case, the optical fiber used to calculate the reference number of turns in past bending loss measurement becomes the standard optical fiber used to set the reference number of turns T1.

By setting the reference number of turns T1 in advance using a standard optical fiber in this way, the time and effort for setting the reference number of turns T1 each time the bending loss of the optical fiber 1 is measured can be reduced.

Note that in the case of setting the reference number of turns T1 in advance, when the bending loss value per one turn of the optical fiber obtained from the bending loss value obtained in STEP 4 is smaller than the bending loss value per one turn of the standard optical fiber obtained from the bending loss value of the standard optical fiber at a predetermined transmission wavelength, the reference number of turns T1 may be reset based on the optical fiber 1. That is, assuming that the optical fiber 1 is a standard optical fiber, a number of turns by which the bending loss value of the transmission loss value of the optical fiber 1 in the region of the predetermined transmission wavelength or less has an exponential function shape with respect to the transmission wavelength may be obtained, and the obtained number of turns may be used as the reference reduction number T1. Thereby, the reference number of turns T1 is recalculated based on the optical fiber 1 that is more resistant to bending, so it is possible to obtain a bending loss value that is not affected by whispering gallery mode light.

Note that when obtaining a bending loss value per one turn of the standard optical fiber obtained from the bending loss value of the standard optical fiber at a predetermined transmission wavelength, the bending loss value L of the standard optical fiber at a predetermined transmission wavelength is first calculated by L[dB]=−10 log(P11[W]/P10[W]), based on the transmitted light power P10 in the state in which the standard optical fiber is wrapped around the mandrel 2 by the reference number of turns T1 and the transmitted light power P11 in the state in which the standard optical fiber is wrapped around the mandrel 2 by the number of turns T2, and then the bending loss value L is divided by a difference between the number of turns T2 and the number of turns T1, whereby the bending loss value can be obtained.

EXAMPLES

Hereinafter, the present disclosure will be described in more detail with reference to Examples. The present disclosure is not limited in any way to the following Examples.

First, the wavelength dependency of the bending loss value with respect to the number of turns of the optical fiber 1 was evaluated. Specifically, the mandrel 2 with a diameter of 30 mm was used, and while changing the number of turns T of the optical fiber 1 wrapped around the mandrel 2 and changing the wavelength of light incident from the light source 3, the bending loss value of the optical fiber 1 for each number of turns was measured. The number of turns T was changed every two turns between 2 turns (2T) and 20 turns (20T). The results are shown in FIG. 3.

Figure 3:
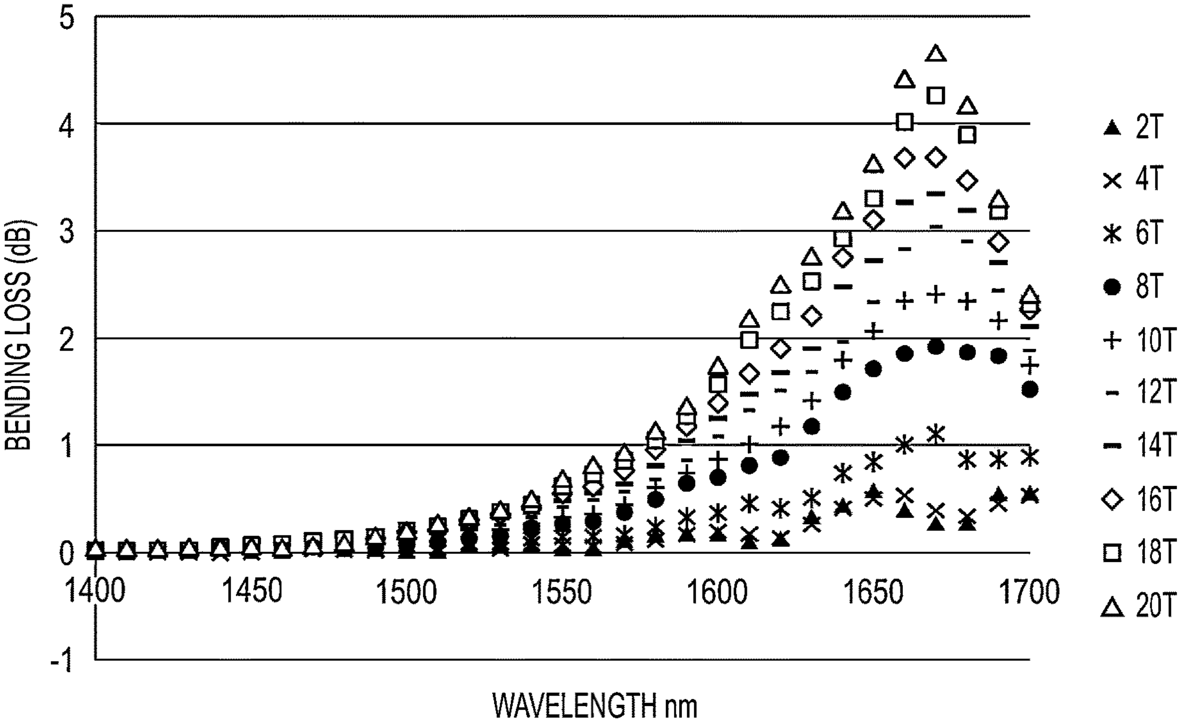
FIG. 3 is a graph showing a wavelength dependency of a bending loss value of an optical fiber.

As shown in FIG. 3, it could be confirmed that as the number of turns T of the optical fiber 1 increases, the wavelength dependency of the bending loss value of the optical fiber 1 tends to have an exponential function shape with respect to the transmission wavelength. It is believed this is because, as the number of times the optical fiber 1 is wrapped around the mandrel 2 increases, the generation of whispering gallery mode light is suppressed, and the bending loss value is not affected by the whispering gallery mode light. In this example, it was found that when the number of turns T is 8 turns or more, the wavelength dependency of the bending loss value of the optical fiber 1 has an exponential function shape with respect to the transmission wavelength.

Figure 4:
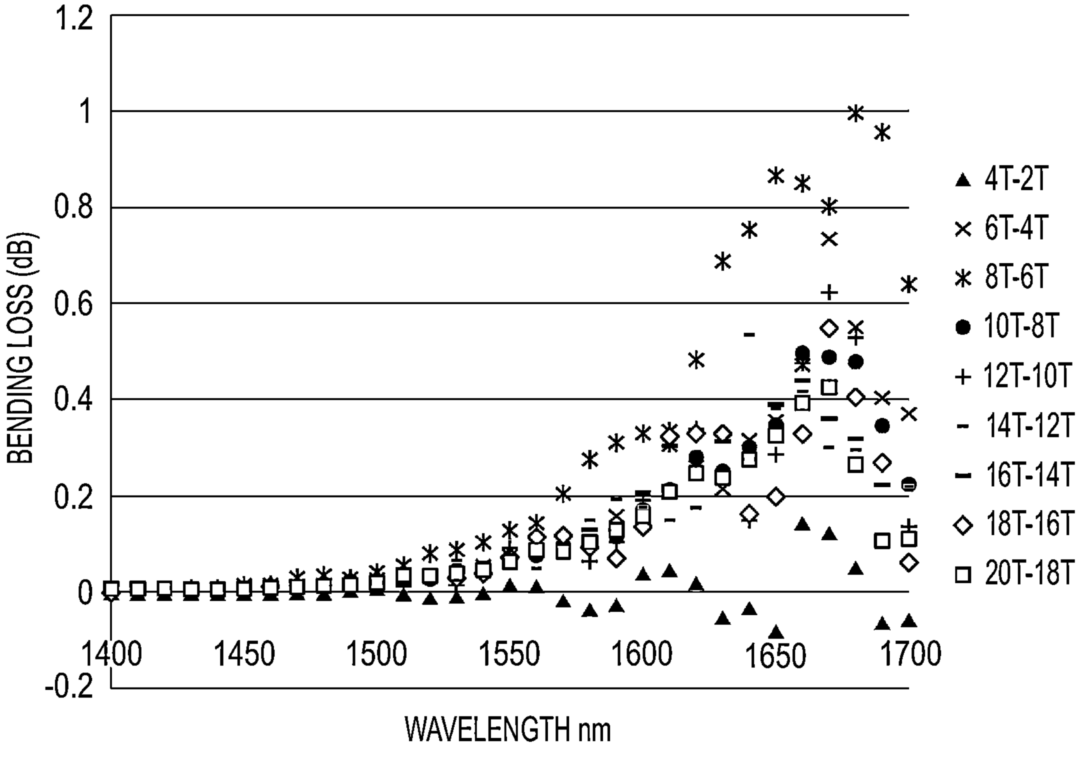
FIG. 4 is a graph showing a wavelength dependency of a bending loss value of an optical fiber.

In addition, the wavelength dependency of the bending loss value of the optical fiber 1 was evaluated. FIG. 4 shows the wavelength dependency of the bending loss value of the optical fiber 1 calculated based on the bending loss value of the optical fiber 1 calculated in FIG. 3. Specifically, the bending loss value of the optical fiber 1 was calculated based on a difference between two bending loss values for numbers of turns which are different by two turns.

As shown in FIG. 4, it was found that, for example, the bending loss value (value indicated by an index of 4T-2T in the drawing) calculated by the difference between the bending loss value when the number of turns T was 4 turns (4T) and the bending loss value when the number of turns T was 2 turns (2T) did not maintain the wavelength dependency of the exponential function shape. It is believed this is because the number of turns T was small and the bending loss value was affected by whispering gallery mode light.

On the other hand, it was found that, for example, the bending loss value (value indicated by an index of 20T-18T in the drawing) calculated by the difference between the bending loss value when the number of turns T was 20 turns (20T) and the bending loss value when the number of turns T was 18 turns (18T) maintained the wavelength dependency of the exponential function shape. It is believed this is because the number of turns T was large and the bending loss value was not affected by whispering gallery mode light.

Although the present invention has been described in detail with reference to the specific embodiments, it is obvious to one skilled in the art that a variety of changes and modifications can be made without departing from the spirit and scope of the present invention. In addition, the numbers, positions, shapes, and the like of the constitutional members described above are not limited to those in the above embodiment, and can be changed to suitable numbers, positions, shapes, and the like when implementing the present invention.

In the above embodiment, the bending loss value of the optical fiber 1 is calculated based on two bending loss values obtained for the optical fibers 1 with number of turns s that are different by two turns. However, the bending loss value of the optical fiber 1 may be calculated from two bending loss values obtained for the optical fibers 1 with numbers of turns which are different by one turn or 3 turns or more.

REFERENCE SIGNS LIST

1: optical fiber
2: mandrel

3: light source
4: power meter
P0: power of incident light
P1: power of emitted light

What is claimed is:

1. A method for measuring a bending loss of an optical fiber coated with resin, the method comprising:

determining a reference number of turns by which a wavelength dependency of a bending loss value of the optical fiber in a region of a predetermined transmission wavelength or less when the optical fiber is wrapped around a mandrel with a predetermined diameter has an exponential function shape with respect to a transmission wavelength;

causing light with a predetermined power at the predetermined transmission wavelength to be incident on a first end of the optical fiber in a state in which the optical fiber is wrapped around the mandrel by the reference number of turns, and measuring a power of light emitted from a second end of the optical fiber to obtain a first power of light;

causing light with the predetermined power at the predetermined transmission wavelength to be incident on the first end of the optical fiber in a state in which the optical fiber is wrapped around the mandrel by a number of turns larger than the reference number of turns, and measuring a power of light emitted from the second end of the optical fiber to obtain a second power of light; and obtaining, based on the first power of light and the second power of light, a bending loss value of the optical fiber at the predetermined transmission wavelength when the optical fiber is bent with the predetermined diameter.

2. The method for measuring a bending loss of an optical fiber according to claim 1, wherein the determining the reference number of turns comprises:

wrapping the optical fiber around the mandrel with the predetermined diameter;

obtaining a number of turns by which a wavelength dependency of a bending loss value of the optical fiber in the region of the predetermined transmission wavelength or less has an exponential function shape with respect to a transmission wavelength; and using the obtained number of turns of the optical fiber as the reference number of turns.

3. The method for measuring a bending loss of an optical fiber according to claim 1, wherein the determining the reference number of turns comprises:

using, as the reference number of turns, a number of turns obtained by preparing a standard optical fiber, wrapping the standard optical fiber around a mandrel with the predetermined diameter, and obtaining a number of turns by which a wavelength dependency of a bending loss value of the standard optical fiber in a region of the predetermined transmission wavelength or less has an exponential function shape with respect to a transmission wavelength.

4. The method for measuring a bending loss of an optical fiber according to claim 3, wherein, when a bending loss value per one turn of the optical fiber obtained from the bending loss value of the optical fiber is smaller than a bending loss value per one turn of the standard optical fiber obtained from the bending loss value of the standard optical fiber, the optical fiber is used as the standard optical fiber for determining the reference number of turns.

5. The method for measuring a bending loss of an optical fiber according to claim 1, the method further comprising:

plotting bending loss values in a graph while changing a number of turns of the optical fiber wrapped around a mandrel with a predetermined diameter and changing a wavelength of light incident on a light source in a region of a predetermined transmission wavelength or less.

* * * * *